United States Patent
Vegulla et al.

(10) Patent No.: US 11,947,411 B2
(45) Date of Patent: Apr. 2, 2024

(54) SYSTEMS AND METHODS FOR EVALUATING, VALIDATING, CORRECTING, AND LOADING DATA FEEDS BASED ON ARTIFICIAL INTELLIGENCE INPUT

(71) Applicant: BANK OF AMERICA CORPORATION, Charlotte, NC (US)

(72) Inventors: Vijaya Kumar Vegulla, Telangana (IN); Rama Venkata S. Kavali, Frisco, TX (US); Venugopala Rao Randhi, Telangana (IN); Damodarrao Thakkalapelli, Agoura Hills, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 127 days.

(21) Appl. No.: 17/680,561

(22) Filed: Feb. 25, 2022

(65) Prior Publication Data
US 2023/0273847 A1    Aug. 31, 2023

(51) Int. Cl.
*G06F 11/07* (2006.01)
*G06F 11/34* (2006.01)

(52) U.S. Cl.
CPC ...... *G06F 11/0754* (2013.01); *G06F 11/0715* (2013.01); *G06F 11/0793* (2013.01); *G06F 11/3452* (2013.01)

(58) Field of Classification Search
CPC ............. G06F 11/0754; G06F 11/0715; G06F 11/0793; G06F 11/3452; G06F 16/254
See application file for complete search history.

(56) References Cited

U.S. PATENT DOCUMENTS

| | | | |
|---|---|---|---|
| 4,888,690 A | 12/1989 | Huber | |
| 2014/0281699 A1* | 9/2014 | Kota | G06F 11/004 714/15 |
| 2022/0350704 A1* | 11/2022 | Ehsan | G06F 16/254 |

* cited by examiner

*Primary Examiner* — William Spieler
(74) *Attorney, Agent, or Firm* — Moore & Van Allen PLLC; R.W. McCord Rayburn

(57) ABSTRACT

Systems, computer program products, and methods are described herein for evaluating, validating, correcting, and loading data feeds based on artificial intelligence input. The present invention may be configured to receive a data feed from a source for loading to a target data structure, analyze, based on historical feed data, metadata of the data feed to determine a likelihood of the data feed failing to load, and determine whether the likelihood of the data feed failing to load satisfies a threshold. The present invention may be configured to load the data feed to the target data structure, determine, after loading the data feed to the target data structure, whether the data feed failed to load, and either correct errors in the data feed or add error-containing portions of the data feed to a failed data log.

20 Claims, 6 Drawing Sheets

SYSTEMS AND METHODS FOR EVALUATING, VALIDATING, CORRECTING, AND LOADING DATA FEEDS BASED ON ARTIFICIAL INTELLIGENCE INPUT

FIELD OF THE INVENTION

The present invention embraces systems and methods for evaluating, validating, correcting, and loading data feeds based on artificial intelligence input.

BACKGROUND

An electronic system may be configured to receive data feeds from sources and load the data feeds to data structures. The electronic system may be configured to perform the process of receiving and loading the data feeds in accordance with a service level agreement establishing expected characteristics of the process, such as a speed at which the process is completed, a time period by which the process is to be completed, and/or the like.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for evaluating, validating, correcting, and loading data feeds based on artificial intelligence input. The system may include at least one non-transitory storage device and at least one processing device coupled to the at least one non-transitory storage device, where the at least one processing device may be configured to receive a data feed from a source for loading to a target data structure, analyze, based on historical feed data, metadata of the data feed to determine a likelihood of the data feed failing to load, and determine whether the likelihood of the data feed failing to load satisfies a threshold. The at least one processing device may be configured to load, based on determining that the likelihood of the data feed failing to load satisfies the threshold, the data feed to the target data structure and determine, after loading the data feed to the target data structure, whether the data feed failed to load. The at least one processing device may be configured to, based on determining that the data feed failed to load, iteratively, and until each subdivided data feed loads or is added to a failed data log, subdivide, into subdivided data feeds, the data feed or each of the subdivided data feeds that fails to load and that is not a single data row, where a number of the subdivided data feeds is determined using a machine learning model, load each of the subdivided data feeds to the target data structure, and, for each of the subdivided data feeds that fails to load and that is a single data row, correct an error in the subdivided data feed or add the subdivided data feed to the failed data log. The at least one processing device may be configured to transmit, to a user device associated with the source, the failed data log.

In some embodiments, the at least one processing device may be configured to, when analyzing the metadata of the data feed, determine, based on the metadata of the data feed and historical feed data, a failure history of the data feed, a size of the data feed, a service-level agreement of the data feed, and a cost of delaying loading the data feed. Additionally, or alternatively, the at least one processing device may be configured to, when analyzing the metadata of the data feed, determine, based on the failure history of the data feed, whether the data feed is associated with a history of repeated load failures, whether the size of the data feed satisfies a size threshold, whether the data feed is associated with a recent load failure, and whether the cost of delaying loading the data feed impacts the service-level agreement of the data feed. In some embodiments, the at least one processing device may be configured to determine the likelihood of the data feed failing to load based on whether the data feed is associated with a history of repeated load failures, whether the size of the data feed satisfies the size threshold, whether the data feed is associated with a recent load failure, and whether the cost of delaying loading the data feed impacts the service-level agreement of the data feed.

In some embodiments, the at least one processing device may be configured to transmit, based on determining that the likelihood of the data feed failing to load does not satisfy the threshold and to the user device associated with the source, a notification including the metadata.

In some embodiments, the at least one processing device may be configured to correct, based on determining that the likelihood of the data feed failing to load does not satisfy the threshold, one or more errors in the data feed based on the metadata of the data feed and historical feed data.

In some embodiments, the at least one processing device may be configured to attempt to correct, based on determining that the likelihood of the data feed failing to load does not satisfy the threshold, one or more errors in the data feed based on the metadata of the data feed and historical feed data, determine whether the one or more errors in the data feed are corrected, and transmit, based on determining that the one or more errors in the data feed are not corrected and to the user device associated with the source, a notification including the metadata and instructions to correct the one or more errors in the data feed. Additionally, or alternatively, the at least one processing device may be configured to load, based on determining that the one or more errors in the data feed are corrected, the data feed to the target data structure.

In some embodiments, the at least one processing device may be configured to, when correcting the error in the subdivided data feed, determine, based on the metadata of the data feed and historical feed data, whether the error in the subdivided data feed is a formatting error in a value in the single data row, convert, based on determining that the error in the subdivided data feed is the formatting error in the value in the single data row, the value to an acceptable format based on the metadata, load the single data row with the converted value to a temporary table having a same schema as the target data structure, and load the temporary table to the target data structure.

In some embodiments, the at least one processing device may be configured to, when correcting the error in the subdivided data feed, determine, based on the metadata of the data feed and historical feed data, whether the error in the subdivided data feed is a data integrity error in a value in the single data row, identify, based on the metadata of the data feed and the historical feed data, another value having similar characteristics to the value, load the single data row with the other value to a temporary table having a same schema as the target data structure, and load the temporary table to the target data structure.

In some embodiments, the at least one processing device may be configured to, when correcting the error in the subdivided data feed, determine, based on the metadata of the data feed and historical feed data, whether the error in the subdivided data feed is missing data in the single data row, identify, based on the metadata of the data feed and the historical feed data, historical data corresponding to the missing data, load the single data row with the historical data to a temporary table having a same schema as the target data structure, and load the temporary table to the target data structure.

In some embodiments, the at least one processing device may be configured to determine, based on the metadata of the data feed and historical feed data, whether the data feed includes multiple errors in a column, determine, based on determining that the data feed include multiple errors in the column and based on the metadata of the data feed and the historical feed data, whether an entity priority of the data feed satisfies a threshold, vertically subdivide, based on the entity priority of the data feed satisfying the threshold, the data feed into vertically subdivided data feeds to remove the column, and load the vertically subdivided data feeds to the target data structure.

In some embodiments, the at least one processing device may be configured to determine, based on determining that the data feed failed to load and based on the metadata of the data feed and historical feed data, whether the data feed failed to load due to an input/output error, import, based on determining that the data feed failed to load due to the input/output error, the data feed to another source, and load the data feed from the other source to the target data structure.

In some embodiments, the at least one processing device may be configured to determine, based on determining that the data feed failed to load and based on the metadata of the data feed and historical feed data, whether the data feed failed to load due to inadequate resources of a processor, determine, based on determining that the data feed failed to load due to the inadequate resources of the processor, whether one or more low priority connections are using the processor, suspend, based on determining that the one or more low priority connections are using the processor, the one or more low priority connections, and load, while suspending the one or more low priority connections, the data feed to the target data structure.

In some embodiments, the at least one processing device may be configured to determine, based on determining that the data feed failed to load and based on the metadata of the data feed and historical feed data, whether the data feed failed to load due to inadequate resources of a processor, determine, based on determining that the data feed failed to load due to the inadequate resources of the processor, whether one or more low priority connections are using the processor, reschedule, based on a log and based on determining that no low priority connections are using the processor, loading of the data feed to another time period, transmit, to the user device associated with the source, a notification including the other time period, and load the data feed to the target data structure during the other time period.

In some embodiments, the at least one processing device may be configured to, when analyzing the metadata of the data feed to determine the likelihood of the data feed failing to load, compare characteristics of the data feed and historical characteristics of historical data feeds that failed to load and determine the likelihood of the data feed failing to load based on the comparison.

In another aspect, the present invention embraces a computer program product for evaluating, validating, correcting, and loading data feeds based on artificial intelligence input. The computer program product may include a non-transitory computer-readable medium including code causing a first apparatus to receive a data feed from a source for loading to a target data structure, analyze, based on historical feed data, metadata of the data feed to determine a likelihood of the data feed failing to load, and determine whether the likelihood of the data feed failing to load satisfies a threshold. The non-transitory computer-readable medium may include code causing the first apparatus to load, based on determining that the likelihood of the data feed failing to load satisfies the threshold, the data feed to the target data structure and determine, after loading the data feed to the target data structure, whether the data feed failed to load. The non-transitory computer-readable medium may include code causing the first apparatus to, based on determining that the data feed failed to load, iteratively, and until each subdivided data feed loads or is added to a failed data log, subdivide, into subdivided data feeds, the data feed or each of the subdivided data feeds that fails to load and that is not a single data row, where a number of the subdivided data feeds is determined using a machine learning model, load each of the subdivided data feeds to the target data structure, and, for each of the subdivided data feeds that fails to load and that is a single data row, correct an error in the subdivided data feed or add the subdivided data feed to the failed data log. The non-transitory computer-readable medium may include code causing the first apparatus to transmit, to a user device associated with the source, the failed data log.

In some embodiments, the non-transitory computer-readable medium may include code causing the first apparatus to, when analyzing the metadata of the data feed, determine, based on the metadata of the data feed and historical feed data, a failure history of the data feed, a size of the data feed, a service-level agreement of the data feed, and a cost of delaying loading the data feed.

In some embodiments, the non-transitory computer-readable medium may include code causing the first apparatus to, when analyzing the metadata of the data feed, determine, based on the failure history of the data feed, whether the data feed is associated with a history of repeated load failures, whether the size of the data feed satisfies a size threshold, whether the data feed is associated with a recent load failure, and whether the cost of delaying loading the data feed impacts the service-level agreement of the data feed.

In yet another aspect, a method for evaluating, validating, correcting, and loading data feeds based on artificial intelligence input is presented. The method may include receiving a data feed from a source for loading to a target data structure, analyzing, based on historical feed data, metadata of the data feed to determine a likelihood of the data feed failing to load, and determining whether the likelihood of the data feed failing to load satisfies a threshold. The method may include loading, based on determining that the likelihood of the data feed failing to load satisfies the threshold, the data feed to the target data structure and determining, after loading the data feed to the target data structure, whether the data feed failed to load. The method may include, based on determining that the data feed failed to load, iteratively, and until each subdivided data feed loads or is added to a failed data log, subdividing, into subdivided data feeds, the data feed or each of the subdivided data feeds that fails to load and that is not a single data row, where a number of the subdivided data feeds is determined using a machine learning model, loading each of the subdivided data feeds to the target data structure, and, for each of the subdivided data feeds that fails to load and that is a single data row, correcting an error in the subdivided data feed or adding the subdivided data feed to the failed data log. The method may include transmitting, to a user device associated with the source, the failed data log.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
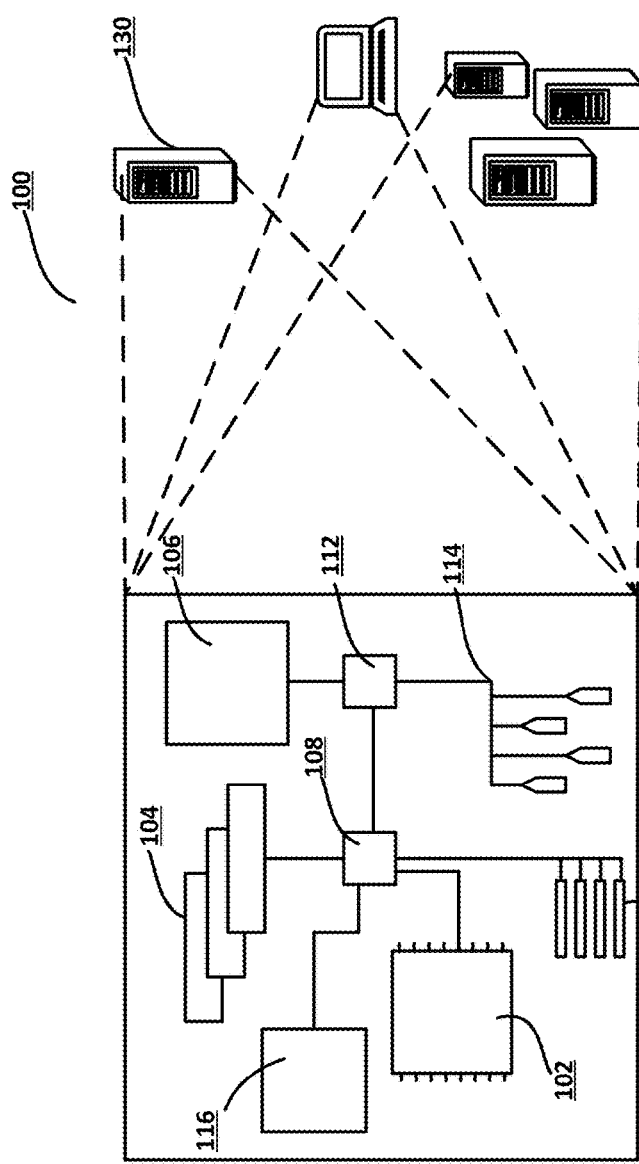
Figure 1:
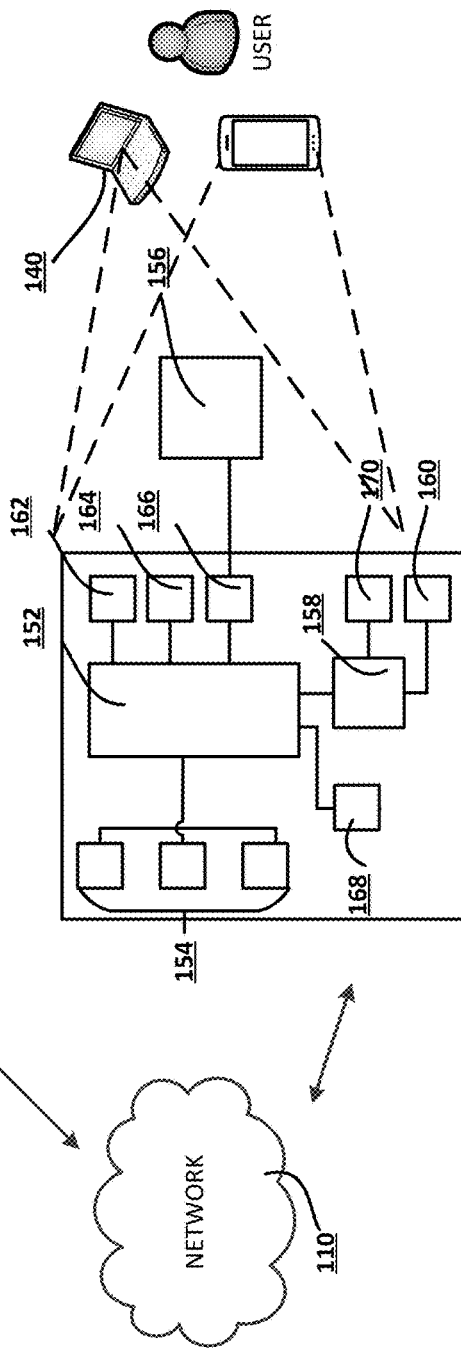
Figure 2:
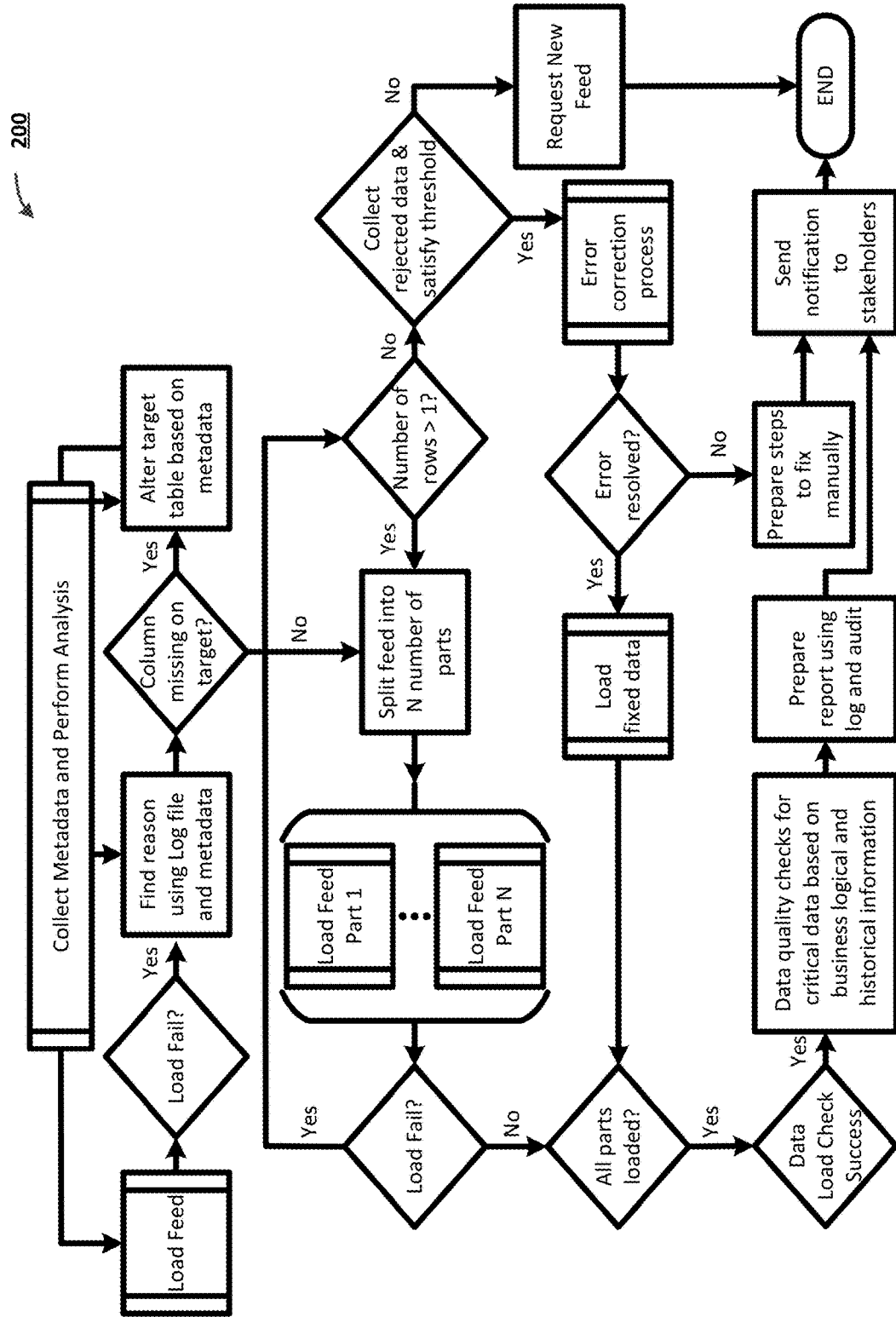
Figure 3:
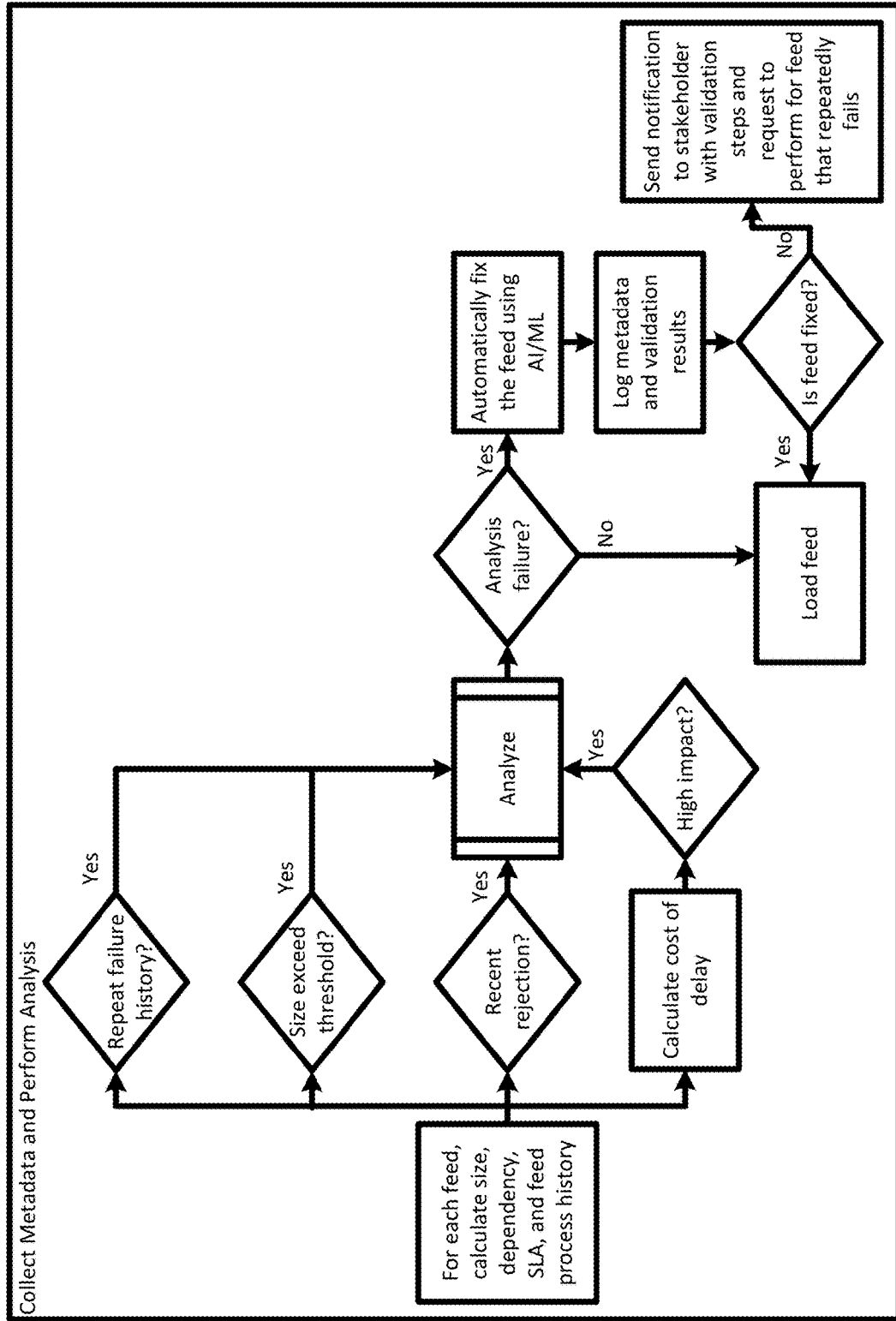
Figure 4A:
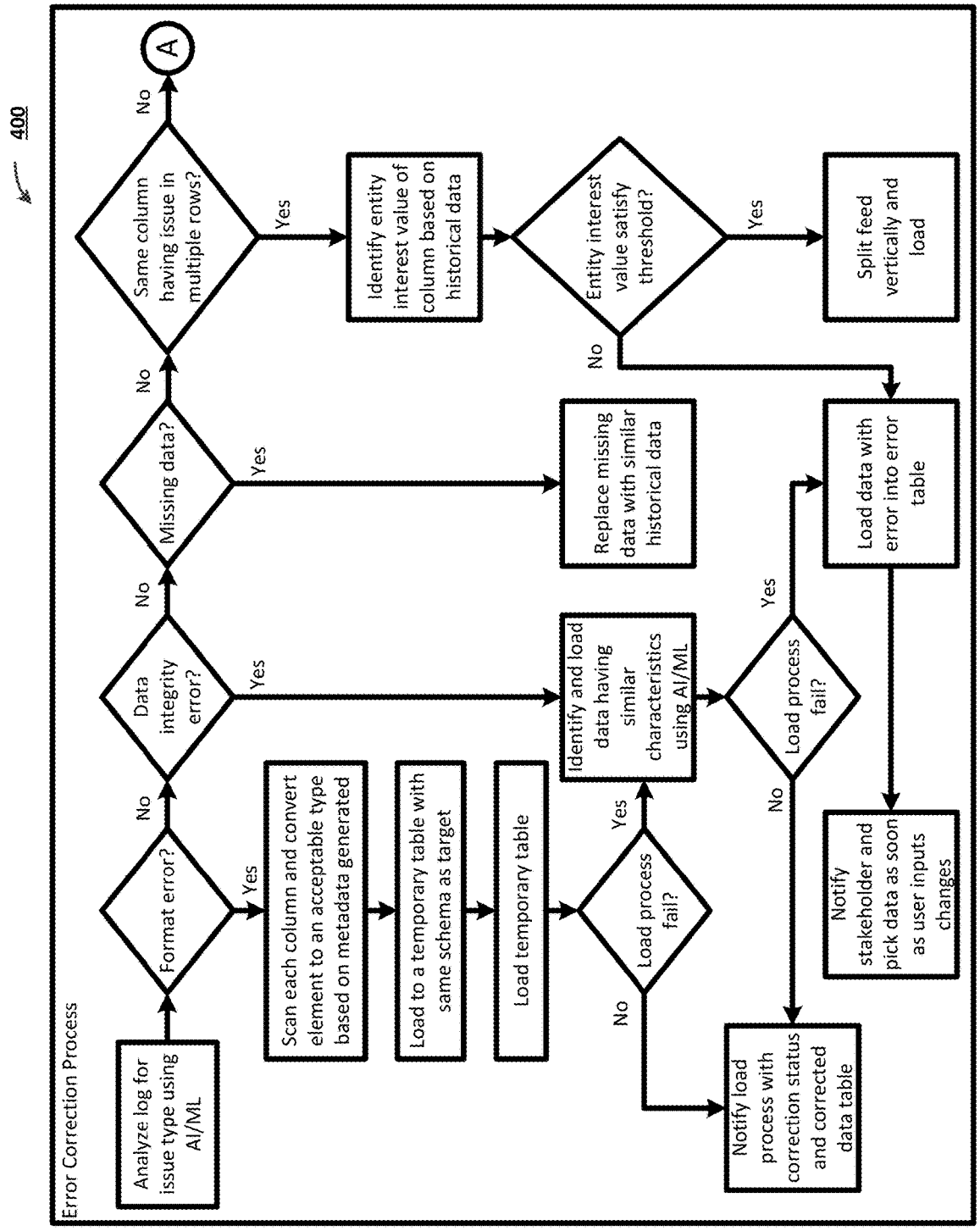
Figure 4B:
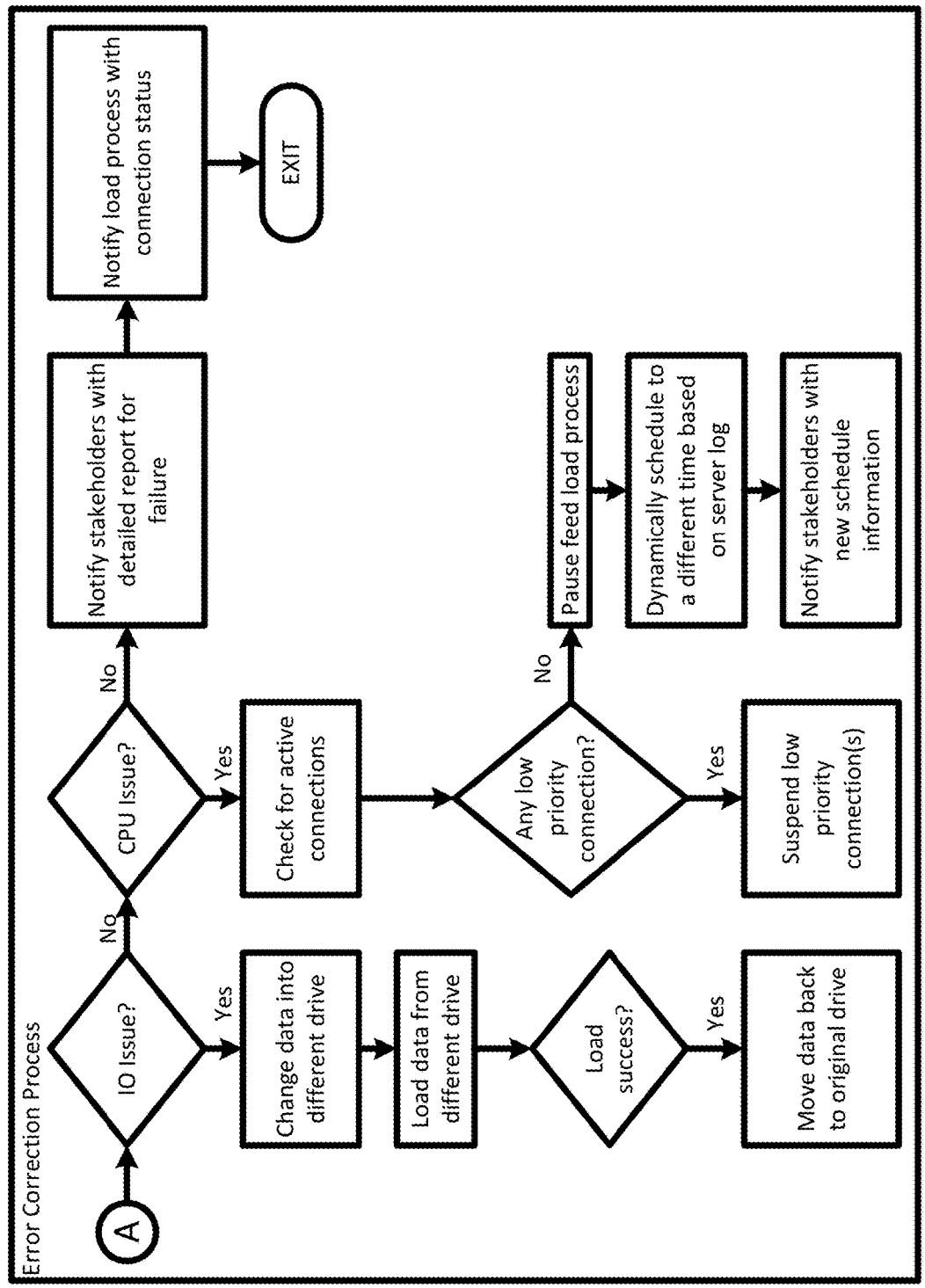
Figure 5:
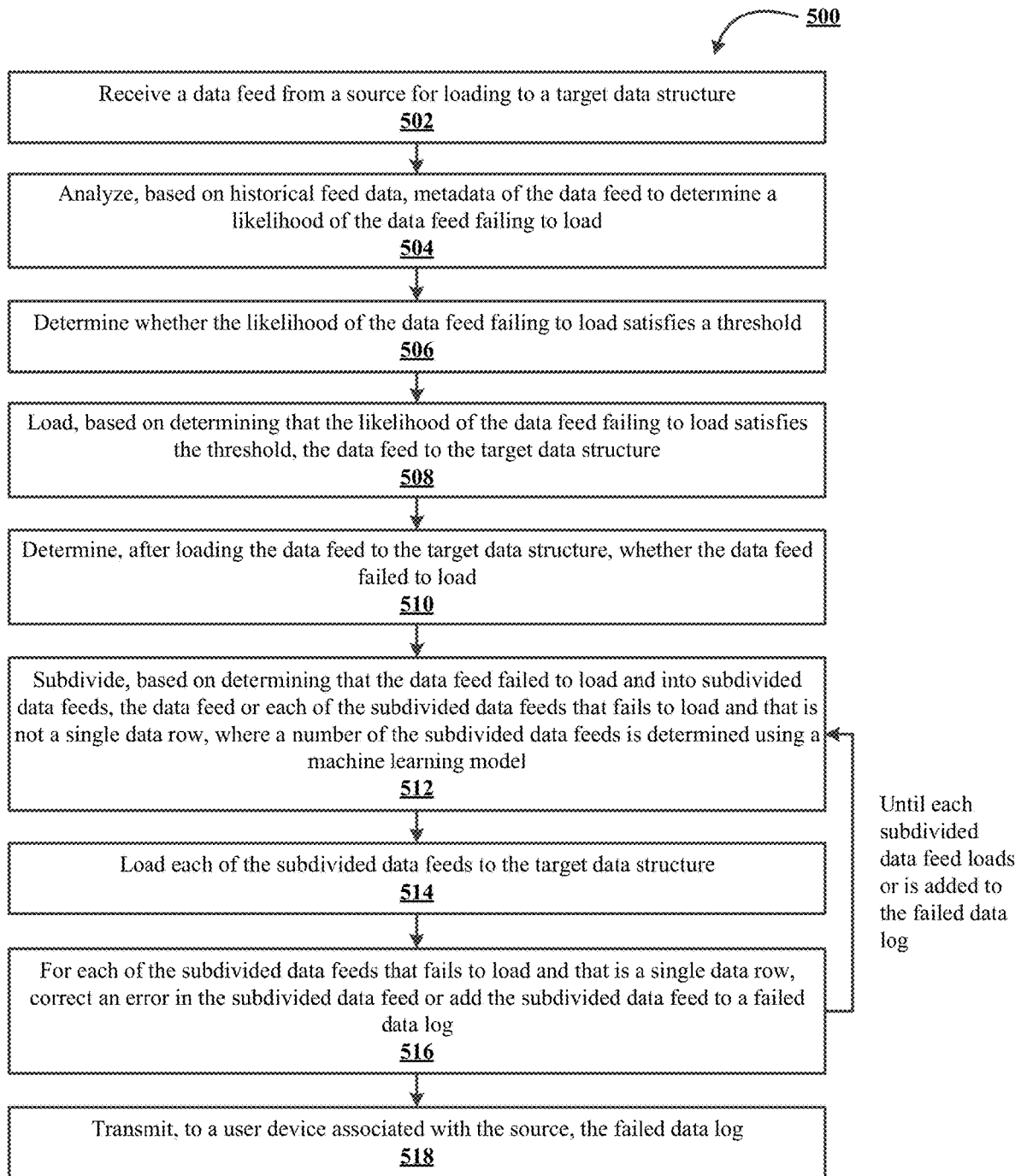

Having thus described embodiments of the invention in general terms, reference will now be made the accompanying drawings, wherein:

FIG. 1 illustrates technical components of a system for evaluating, validating, correcting, and loading data feeds based on artificial intelligence input, in accordance with an embodiment of the invention;

FIG. 2 illustrates a process flow for evaluating, validating, correcting, and loading data feeds based on artificial intelligence input, in accordance with an embodiment of the invention;

FIG. 3 illustrates a process flow for evaluating, validating, correcting, and loading data feeds based on artificial intelligence input, in accordance with an embodiment of the invention;

FIGS. 4A and 4B illustrate a process flow for evaluating, validating, correcting, and loading data feeds based on artificial intelligence input, in accordance with an embodiment of the invention; and FIG. 5 illustrates a process flow for evaluating, validating, correcting, and loading data feeds based on artificial intelligence input, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to receive data feeds from sources and load the data feeds to data structures. The electronic system may be configured to perform the process of receiving and loading the data feeds in accordance with a service level agreement establishing expected characteristics of the process, such as a speed at which the process is completed, a time period by which the process is to be completed, and/or the like. However, errors (e.g., anomalies and/or the like) in the data feed, network issues, inadequate resources of a processor, and/or the like cause loading of the data feed to fail, which negatively impacts the electronic system's ability to comply with the service level agreement. Furthermore, such failures consume significant computing resources, network resources, and financial resources. Additionally, such failures may require a user to manually inspect the data in the data feed, which negatively impacts the electronic system's ability to comply with the service level agreement and consumes additional computing resources, network resources, and financial resources. Furthermore, the user may have limited data for determining what type of error caused the data feed to fail to load. Available data may be limited in scope without providing a holistic view of the interoperable elements of the system environment. Even if enough data was available to such users, the users querying databases of information with the data and then processing the data to obtain some meaningful conclusion would consume significant computing resources, network resources, and financial resources.

Some embodiments described herein provide a system, a computer program product, and/or a method for evaluating, validating, correcting, and loading data feeds based on artificial intelligence input. For example, a system (e.g., an electronic system for evaluating, validating, correcting, and loading data feeds based on artificial intelligence input and/or the like) may be configured to receive a data feed from a source for loading to a target data structure, analyze, based on historical feed data, metadata of the data feed to determine a likelihood of the data feed failing to load, and determine whether the likelihood of the data feed failing to load satisfies a threshold. By analyzing the metadata of the data feed and determining whether a likelihood of the data feed failing to load satisfies a threshold before loading the data feed, the system may take proactive steps to mitigate loading failures thereby conserving resources that would otherwise be consumed by loading failures and preventing loading failures from negatively impacting the service level agreements.

In some embodiments, the system may be configured to load, based on determining that the likelihood of the data feed failing to load satisfies the threshold, the data feed to the target data structure, determine, after loading the data feed to the target data structure, whether the data feed failed to load, and, based on determining that the data feed failed to load, subdivide the data feed and load the subdivided data feeds to the target data structure. For subdivided data feeds that fail, the system may be configured to further subdivide the data feeds, until data causing the error is isolated. By subdividing and loading the subdivided parts of the data feed, the system improves the chances of preventing a negative impact on the service level agreement by loading the data that is not causing errors and eliminates a manual inspection of the data feed by a user to identify the data causing the error, thereby conserving computing resources, network resources, and financial resources.

In some embodiments, the system may be configured to, for each of the subdivided data feeds that fails to load and that is a single data row, correct an error in the subdivided data feed or add the subdivided data feed to the failed data log. For example, the system may automatically correct formatting errors, data integrity errors, missing data, columns causing errors, input/output issues, processing issues, and/or the like. Additionally, or alternatively, the system may automatically generate a failed data including the data that caused errors in the loading of the data feed. By correcting errors in the data feed or adding the subdivided data feed to the failed data log, the system conserves resources that would otherwise be consumed by a user manually inspecting the data feed to identify the data causing the error and manually correct the data. Furthermore, the user may have limited data for determining what type of error caused the data feed to fail to load, and the system may using artificial intelligence input and historical data to automatically determine the type of error and replace the data with new data that will not cause an error.

In some embodiments, the system may receive data feeds from sources for loading to target data structures, analyze the metadata of the feeds to determine likelihoods of the data feeds failing to load based on historical data, and determine whether the likelihoods satisfy thresholds. For data feeds having a higher likelihood of failing, the system may attempt to perform an error correction process using AI/ML on the data feeds before attempting to load the data feeds to a target data structure. For data feeds having lower likelihoods of failing, the system may attempt to load the feeds. If a data feed fails to load, the system may split/subdivide the data feed into parts and attempt to load the parts. The number of parts may be determined via AI/ML. If a part fails to load, the system may determine if the part includes more than one row and, if it does, further split/subdivide the part and attempt to load the further subdivided/split parts. If the system determines that the part includes only one row, the system may use AI/ML and historical data to identify and attempt to correct the error. If the system fails to correct an error, the system may generate a notification including information to assist a user with manually fixing the error in the data feed. The system may continuously update/retrain the AI/ML using its own outcomes to improve performance of the system over time.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for evaluating, validating, correcting, and loading data feeds based on artificial intelligence input within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for evaluating, validating, correcting, and loading data feeds based on artificial intelligence input, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more data feed management systems, data feed orchestration systems, data feed validation systems, data feed correction systems, and/or data feed healing systems (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more data feed management systems, data feed orchestration systems, data feed validation systems, data feed correction systems, and/or data feed healing systems may perform one or more of the steps described herein with respect to the process flows described herein with respect to FIGS. 2, 3, 4A, 4B, and/or 5.

FIG. 2 illustrates a process flow 200 for evaluating, validating, correcting, and loading data feeds based on artificial intelligence input, in accordance with an embodiment of the invention. In some embodiments, one or more data feed management systems, data feed orchestration systems, data feed validation systems, data feed correction systems, data feed healing systems, and/or the like (e.g., similar to one or more of the systems described herein with respect to FIG. 1) may perform one or more of the steps of process flow 200.

As shown in FIG. 2, the process flow 200 may include a subprocess for collecting metadata and performing analyses of data feeds, a subprocess for loading data feeds, one or more subprocesses for loading parts of data feeds, a subprocess for error correction, a subprocess for loading fixed data, and/or the like.

An entity may operate, manage, and/or the like a system environment throughout which data feeds are moved to and from systems, data structures, devices, and/or the like. In such system environments, exchanging data with accuracy and on time to avoid breaching service level agreements may be challenging. For example, if a data load fails due to a data anomaly within a source feed or a network issue, there is a high likelihood that the loading failure will impact a service level agreement and/or an entity function.

In some embodiments, a system may be configured to fix and/or correct and reload the data that failed to load automatically. Such a system may reduce a likelihood that a data load failure will compromise the service level agreement by performing auto-correcting techniques proactively on data loading issue using algorithms, historical data, logs, and/or the like. For example, the system may perform data anomaly detection and correction using artificial intelligence and/or machine learning before loading data. As another example, the system may split the data into batches (e.g., subdivide a data feed and/or the like) to identify an error. As yet another example, the system may analyze the data and to identify data type issues or column mismatch issues, and, if identified, attempt to correct the issues based on historical data and/or notify a user associated with the data if the issue is critical and automatically reload the data after correction. As yet another example, the system may provide notifications to users associated with the data with information to take manual corrective actions if identified issues exceed a defined element anomaly threshold. Such a system may, as noted, perform one or more of the steps of process flow 200.

As shown in FIG. 2, the process flow 200 may include collecting metadata and performing analysis on a data feed. For example, the process flow 200 may include collecting details regarding each data feed as well as load details for each data feed, which may be stored in metadata associated with the data feeds. In some embodiments, collecting metadata and performing analysis on a data feed may include forming one or more of the steps of process flow 300 described herein with respect to FIG. 3.

As shown in FIG. 2, the process flow 200 may include loading one or more data feeds and determining whether one or more of the data feeds failed to load. For example, the process flow 200 may include loading a data feed to a target data structure, such as a table, a database, and/or the like, receiving a notification from the target data structure, and determining, based on the notification, whether the data feed failed to load. Additionally, or alternatively, the process flow 200 may include identifying a reason for the failure using a log file and/or metadata.

As shown in FIG. 2, the process flow 200 may include determining whether a column is missing on the target data structure and, based on determining that a column is missing, altering the target data structure based on the metadata and re-loading the data feed. Additionally, or alternatively, the process flow 200 may include checking and/or converting the data feed file into a required file type (e.g., xls, csv, and/or the like).

As shown in FIG. 2, the process flow 200 may include, based on determining that a column is not missing, splitting the data feed into N number of parts. In some embodiments, the process flow 200 may include determining the number N using an algorithm and/or a machine learning model. For example, the algorithm and/or the machine learning model may be configured and/or trained using historical data associated with data feeds to determine the number N predicted to have a shortest time for successfully identifying errors and/or successfully loading the entire data feed. In some embodiments, splitting the data feed into N number of parts may include dividing a total number of rows, X, in the data feed by the number N (e.g., X/N) and splitting the data feed into N subdivided data feeds each having about the same number of rows (e.g., X/N rows). Additionally, or alternatively, splitting the data feed into N number of parts may include splitting the data feed into N subdivided data feeds that do not have about the same number of rows.

As shown in FIG. 2, the process flow 200 may include loading each of the feed parts (e.g., Feed Part 1, Feed Part 2, ..., Feed Part N). For example, the process flow 200 may include loading each of the feed parts in parallel. As another example, the process flow 200 may include loading each of the feed parts in series. As yet another example, the process flow 200 may include loading some of the feed parts in parallel and some of the feed parts in series.

As shown in FIG. 2, the process flow 200 may including determining, for each feed part, whether the feed part failed to load and determining, based on the feed part failing to load, whether a number of rows in the feed part is greater than one. As shown in FIG. 2, the process flow 200 may include, based on determining that the number of rows in the feed part that failed to load is greater than one, further splitting the feed part into N number of parts, loading the feed parts, and determining whether the feeds parts failed to load, in a manner similar to that previously described herein.

As shown in FIG. 2, the process flow 200 may include, based on determining that the feed part that failed to load does not contain a number of rows greater than one, collecting the feed parts and/or rows that failed to load and determining whether the amount of rejected/failed data satisfies a threshold and either requesting a new data feed or performing an error correction process on the rejected/failed data. For example, if the rejected/failed data exceeds a threshold (e.g., there is too much rejected/failed data in the data feed), the process flow 200 may include stopping attempts to load the data feed and requesting a new data feed. In some embodiments, the process flow 200 may include performing an error correction process on the rejected/failed data in a manner similar to that described herein with respect to process flow 400 and/or FIGS. 4A and 4B.

As shown in FIG. 2, the process flow 200 may include determining whether the error correction process resolved the rejected/failed data and, based on determining that the error correction process did not resolve the rejected/failed data, preparing instructions for steps to manually fix the rejected/failed data, and sending a notification to stakeholders (e.g., one or more user devices and/or systems associated with the data feed and/or the rejected/failed data). As also shown in FIG. 2, the process flow 200 may include, based on determining that the error correction process did resolve the rejected/failed data, loading the fixed data (e.g., the corrected data that was previously rejected and/or failed to load).

In some embodiments, and as shown in FIG. 2, the process flow 200 may include determining whether all of the data feed parts have been loaded and determining whether the data feed has successfully loaded. For example, the process flow 200 may include performing an extra confirmation that the data feed successfully loaded after determining that all of the data feed parts have been loaded.

As shown in FIG. 2, the process flow 200 may include performing data quality checks for critical data based on business logic and/or historical information. In some embodiments, the process flow 200 may include determining, based on historical data, whether a special case scenario may apply to the feed data if a deviation is identified by performing the data quality checks. Additionally, or alternatively, the process flow 200 may include moving the feed data into a separate data table and sending the separate data table to stakeholders (e.g., one or more user devices and/or systems associated with the data feed and/or the rejected/failed data). In some embodiments, the process flow 200 may include preparing a report using a log file and results of the data quality checks (e.g., an audit and/or the like) and providing the report to stakeholders (e.g., one or more user devices and/or systems associated with the data feed and/or the rejected/failed data).

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for evaluating, validating, correcting, and loading data feeds based on artificial intelligence input, in accordance with an embodiment of the invention. In some embodiments, one or more data feed management systems, data feed orchestration systems, data feed validation systems, data feed correction systems, data feed healing systems, and/or the like (e.g., similar to one or more of the systems described herein with respect to FIG. 1) may perform one or more of the steps of process flow 300.

As shown in FIG. 3, the process flow 300 may include calculating, for each data feed, a size of the data feed, a dependency of the data feed, a service level agreement, and a feed process history. In some embodiments, and as shown in FIG. 3, the process flow 300 may include determining whether each data feed is associated with a repeat failure history. For example, the process flow 300 may include determining (e.g., based on characteristics of a data feed, characteristics of historical data feeds, and/or the like) a likelihood of data feeds from a same source failing to load. In some embodiments, the process flow 300 may include collecting data including characteristics of historical data feeds (e.g., historical data feeds from a source from which the data feed was received, historical data feeds having similar characteristics, historical data feeds loaded to the same target data structure to which the data feed is to be loaded, and/or the like).

As shown in FIG. 3, the process flow 300 may include determining whether a size of the data feed exceeds a threshold size. For example, the process flow 300 may include determining a threshold size over which data feeds have a higher likelihood of failing than smaller sized data feeds, and then determining whether the size of the data feed exceeds the threshold size. As another example, the process flow 300 may include determining a threshold size based on characteristics of a data feed, characteristics of historical data feeds, and/or the like. As yet another example, the process flow 300 may include determining a threshold size using a machine learning model trained with data of historical data feeds (e.g., characteristics of historical data feeds, outcomes of loading the historical data feeds, and/or the like) by providing the machine learning model with characteristics of the data feed.

As shown in FIG. 3, the process flow 300 may include determining whether the data feed is associated with a recent rejection of a data feed. For example, the process flow 300 may include determining whether the data feed is associated with a recent rejection of a data feed based on characteristics of the data feed, characteristics of historical data feeds, a source from which the data feed was received, a target data structure to which the data feed is to be loaded, and/or the like.

In some embodiments, and as shown in FIG. 3, the process flow 300 may include calculating a cost of delay for each data feed. For example, the process flow 300 may include calculating a cost of delay for a data feed based on a service level agreement associated with the data feed. Additionally, or alternatively, and as shown in FIG. 3, the process flow 300 may include determining whether the cost of delay for the data feed will have a high impact on a potential breach of the service level agreement.

As shown in FIG. 3, the process flow 300 may include analyzing each data feed based on the previous determinations (e.g., determining whether each data feed is associated with a repeat failure history, determining whether a size of the data feed exceeds a threshold size, determining whether the data feed is associated with a recent rejection of a data feed, determining whether the cost of delay for the data feed will have a high impact on a potential breach of the service level agreement, and/or the like). In some embodiments, and as shown in FIG. 3, the process flow 300 may include determining whether each data feed failed the analysis. For example, the process flow 300 may include determining whether each data feed failed the analysis based on one of the previous determinations, based on a combination of two of the previous determinations, based on a combination of three of the previous determinations, and/or the like.

As shown in FIG. 3, the process flow 300 may include automatically fixing, based on a data feed failing the analysis, the data feed using artificial intelligence and/or machine learning, and logging metadata and validation results. For example, the process flow 300 may include automatically fixing the data feed using an error correction process similar to that described herein with respect to FIG. 2 and/or process flow 400 and FIGS. 4A and 4B.

In some embodiments, the process flow 300 may include, before loading a data feed, analyzing the data feed and based on determining that the data feed is associated with a repeat failure history, automatically fixing the data feed by, for example, using artificial intelligence and/or machine learning and/or using an error correction process similar to that described herein with respect to FIG. 2 and/or process flow 400 and FIGS. 4A and 4B.

As shown in FIG. 3, the process flow 300 may include determining whether the data feed is fixed and, based on determining that the data feed is not fixed sending a notification to a stakeholder with validation steps and a request to perform the validation steps for the data feed. As also shown in FIG. 3, the process flow 300 may include, based on determining that the data feed is fixed, loading the data feed. For example, the process flow 300 may include loading the data feed in a manner similar to that described herein with respect to process flow 200 and FIG. 2.

Process flow 300 may include additional embodiments, such as any single embodiment or any combination of embodiments described below and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

FIGS. 4A and 4B illustrate a process flow 400 for evaluating, validating, correcting, and loading data feeds based on artificial intelligence input, in accordance with an embodiment of the invention. In some embodiments, one or more data feed management systems, data feed orchestration systems, data feed validation systems, data feed correction systems, data feed healing systems, and/or the like (e.g., similar to one or more of the systems described herein with respect to FIG. 1) may perform one or more of the steps of process flow 400. Additionally, or alternatively, the process flow 400 may be performed in conjunction with and/or as part of the process flow 200 of FIG. 2, the process flow 300 of FIG. 3, and/or the process flow 500 of FIG. 5.

As shown in FIG. 4A, the process flow 400 may include analyzing a log to determine a type of issue that caused an error when attempting to load a data feed using artificial intelligence and/or machine learning. For example, the process flow 400 may include using one or more machine learning models trained using historical data associated with data feeds, historical data associated with outcomes of loading data feeds to data structures, historical data associated with logs, and/or the like.

As shown in FIG. 4A, the process flow 400 may include determining whether the data feed included a formatting error (e.g., a data type mismatch, large values, and/or the like). In some embodiments, and as shown in FIG. 4A, the process flow 400 may include, based on determining that the data feed included a formatting error, scanning each column of the data feed and converting an element in the column to an acceptable type based on metadata generated. For example, the process flow 400 may include changing an element to a similar data type (e.g., as compared to other elements in the column and/or the like) based on criticality of the element and/or data feed and/or based on a likelihood of negative impact to an entity associated with the data feed. As another example, the process flow 400 may include using a cardinality of the column to convert the element. As yet another example, the process flow 400 may include converting the element from a number to a percentage, from a letter to a number, from a fraction to a decimal, from a mixed number to an integer, and/or vice versa. As yet another example, the process flow 400 may include converting the element based on other elements associated with the element (e.g., calculating a return-on-investment based on an outstanding loan amount and an equated monthly installment and/or the like).

As shown in FIG. 4A, the process flow 400 may include loading the data feed including the converted/corrected data to a temporary table having a same schema as the target data structure and loading the temporary table to the target data structure. In some embodiments, and as shown in FIG. 4A, the process flow 400 may include determining whether the temporary table failed to load to the target data structure. Additionally, or alternatively, and as shown in FIG. 4A, the process flow 400 may include, based on determining that the temporary table did not fail to load to the target data structure, notifying the load process (e.g., as shown and described herein with respect to the process flow 200 of FIG. 2) with the correction status and the corrected data table (e.g., the data feed including the temporary table).

As shown in FIG. 4A, the process flow 400 may include, based on determining that the temporary table failed to load to the target data structure, identifying and loading data having similar characteristics to the element using artificial intelligence and/or machine learning. For example, the process flow 400 may include identifying, using artificial intelligence and/or machine learning (e.g., trained using historical data associated with data feeds, historical data associated with outcomes of loading data feeds to data structures, historical data associated with logs, and/or the like), data in the data feed or data in a historical data feed having similar characteristics to the element causing the loading failure. Additionally, or alternatively, the process flow 400 may include loading the similar data to a temporary table having a same schema as the target data structure and loading the temporary table to the target data structure. In some embodiments, and as shown in FIG. 4A, the process flow 400 may include determining whether the temporary table failed to load to the target data structure.

As shown in FIG. 4A, the process flow 400 may include, based on determining that the temporary table did not fail to load to the target data structure, notifying the load process (e.g., as shown and described herein with respect to the process flow 200 of FIG. 2) with the correction status and the corrected data table (e.g., the data feed including the temporary table). As also shown in FIG. 4A, the process flow 400 may include, based on determining that the temporary table failed to load to the target data structure, loading the data including the error into an error table, notifying a stakeholder with the error table, and attempting to load the data from the error table in response to user input changing the error table.

As shown in FIG. 4A, the process flow 400 may include determining whether the data feed includes a data integrity error (e.g., a date less than 1900 years, null values, and/or the like). In some embodiments, and as shown in FIG. 4A, the process flow 400 may include, based on determining that the data feed includes a data integrity error, identifying and loading data having similar characteristics to an element causing the data integrity error using artificial intelligence and/or machine learning and/or based on characteristics of the data (e.g., cardinality and/or the like). For example, the process flow 400 may include identifying, using artificial intelligence and/or machine learning (e.g., trained using historical data associated with data feeds, historical data associated with outcomes of loading data feeds to data structures, historical data associated with logs, and/or the like), data in the data feed or data in a historical data feed having similar characteristics to the element causing the loading failure. In some embodiments, the process flow 400 may include identifying elements in the data feed that are dependent on the element causing the data integrity error and updating the dependent elements based on the similar data used to replace the element causing the data integrity error.

Additionally, or alternatively, the process flow 400 may include loading the similar data to a temporary table having a same schema as the target data structure and loading the temporary table to the target data structure. In some embodiments, and as shown in FIG. 4A, the process flow 400 may include determining whether the temporary table failed to load to the target data structure.

As shown in FIG. 4A, the process flow 400 may include, based on determining that the temporary table did not fail to load to the target data structure, notifying the load process (e.g., as shown and described herein with respect to the process flow 200 of FIG. 2) with the correction status and the corrected data table (e.g., the data feed including the temporary table). As also shown in FIG. 4A, the process flow 400 may include, based on determining that the temporary table failed to load to the target data structure, loading the data including the error into an error table, notifying a stakeholder with the error table, and attempting to load the data from the error table in response to user input changing the error table.

As shown in FIG. 4A, the process flow 400 may include determining whether the data feed includes missing data. In some embodiments, and as shown in FIG. 4A, the process flow 400 may include replacing the missing data with similar historical data (e.g., replacing a missing value of a recent month's loan payment with a value of the previous month's loan payment and/or the like). For example, the process flow 400 may include identifying the similar historical data using artificial intelligence and/or machine learning (e.g., trained using historical data associated with data feeds, historical data associated with outcomes of loading data feeds to data structures, historical data associated with logs, and/or the like). As another example, the process flow 400 may include identifying the similar historical data based on characteristics of data associated with the missing data being similar to the historical data. As yet another example, the process flow 400 may include replacing the missing data with data from a valid portion of the same data feed (e.g., a loan interest rate and/or an exchange rate in a valid row may be used to replace missing data and/or the like).

As shown in FIG. 4A, the process flow 400 may include determining whether a same column in the data feed is having issues loading in multiple rows. In some embodiments, and as shown in FIG. 4A, the process flow 400 may include, based on determining that a same column in the data feed is having issues loading in multiple rows, identifying an entity interest value of the column based on historical data and determining whether the entity interest value satisfies a threshold.

As shown in FIG. 4A, the process flow 400 may include, based on determining that the entity interest value does not satisfy the threshold, loading the data including the column into an error table, notifying a stakeholder with the error table, and attempting to load the data from the error table in response to user input changing the error table. As also shown in FIG. 4A, the process flow 400 may include, based on determining that the entity interest value does satisfy the threshold, splitting the data feed vertically and loading the split data feeds. For example, the process flow 400 may include identifying usage of the column by an entity, determining whether the column is associated with a low entity interest, splitting the feed vertically based on the column being associated with a low entity interest, and updating and/or loading the values of the data feed (e.g., by using regression for the columns associated with high entity interest and/or the like).

As shown in FIG. 4B, the process flow 400 may include determining whether the data feed failed to load due to an input/output issue. In some embodiments, and as shown in FIG. 4B, the process flow 400 may include, based on determining that the data feed failed to load due to an input/output issue, changing the data into a different drive and/or a different source and loading the data from the different drive and/or the different source. Additionally, or alternatively, the process flow 400 may include determining whether the data feed loaded successfully from the different drive and/or the different source and, based on determining that the data feed loaded successfully from the different drive and/or the different source moving the data back to an original drive and/or an original source. For example, the process flow 400 may include moving the data to a different drive and/or a different source and rescheduling jobs to be performed on the data.

As shown in FIG. 4B, the process flow 400 may include determining whether the data feed failed to load due to a CPU issue (e.g., loading the data feed was too CPU intensive, loading the data feed required more processing resources than were available, and/or the like). In some embodiments, and as shown in FIG. 4B, the process flow 400 may include, based on determining that the data feed failed to load due to a CPU issue, checking for active connections and determining whether any of the active connections are low priority connections. As shown in FIG. 4B, the process flow 400 may include, based on determining that one or more of the active connections are low priority connections, suspending the one or more active connections that are low priority connections and re-loading the data feed. For example, the process for 400 may include, during the data feed loading process, continuing to determine whether any connections are low priority connections (e.g., users that are not critical and/or the like) and holding those connections from using server resources.

As also shown in FIG. 4B, the process flow 400 may include, based on determining that none of the active connections are low priority connections, pausing the data feed loading process, dynamically scheduling the data feed loading process to a different time based on a server log, and notifying stakeholders with the new schedule information. Additionally, or alternatively, the process flow 400 may include dynamically scheduling other data feed loading processes to different times based on the server log, re-initiating the data feed loading process, and notifying the stakeholders of the other data feed loading processes with the new schedule information.

As shown in FIG. 4B, the process flow 400 may include notifying stakeholders associated with the data feed with a detailed report for the failure and notifying the load process with the connection status. For example, the detailed report may include information associated with failed attempts to load the data feed or parts of the data feed, information associated with format errors, data integrity errors, missing data, columns causing errors, input/output issues, CPU issues, and/or the like, information associated with attempts to correct format errors, data integrity errors, missing data, columns causing errors, input/output issues, and/or CPU issues. As another example, the detailed report may include information associated with failed attempts to load the data feed or parts of the data feed and information indicating that the system failed to identify any format errors, data integrity errors, missing data, columns causing errors, input/output issues, CPU issues, and/or the like associated with the data feed.

Process flow 400 may include additional embodiments, such as any single embodiment or any combination of embodiments described below and/or in connection with one or more other processes described elsewhere herein. Although FIGS. 4A and 4B show example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

FIG. 5 illustrates a process flow 500 for evaluating, validating, correcting, and loading data feeds based on artificial intelligence input, in accordance with an embodiment of the invention. In some embodiments, one or more data feed management systems, data feed orchestration systems, data feed validation systems, data feed correction systems, data feed healing systems, and/or the like (e.g., similar to one or more of the systems described herein with respect to FIG. 1) may perform one or more of the steps of process flow 500.

A shown in block 502, the process flow 500 may include receiving a data feed from a source for loading to a target data structure. For example, a system, a user device, and/or the like may transmit a request to load the data feed from the source to the target data structure and the data feed management system may receive the request and/or the data feed.

As shown in block 504, the process flow 500 may include analyzing, based on historical feed data, metadata of the data feed to determine a likelihood of the data feed failing to load. For example, a system may be configured to perform one or more processes and/or one or more steps in a manner similar to that described herein with respect to process flow 300 and FIG. 3 to analyze the metadata of the data feed and determine a likelihood of the data feed failing to load.

As shown in block 506, the process flow 500 may include determining whether the likelihood of the data feed failing to load satisfies a threshold. For example, a system may be configured to perform one or more processes and/or one or more steps in a manner similar to that described herein with respect to process flow 300 and FIG. 3 to determine whether the likelihood of the data feed failing to load satisfies a threshold.

As shown in block 508, the process flow 500 may include loading, based on determining that the likelihood of the data feed failing to load satisfies the threshold, the data feed to the target data structure. For example, a system may be configured to perform one or more processes and/or one or more steps in a manner similar to that described herein with respect to process flows 200, 300, and/or 400 and FIGS. 2, 3, 4A, and/or 4B to load the data feed to the target data structure.

As shown in block 510, the process flow 500 may include determining, after loading the data feed to the target data structure, whether the data feed failed to load. For example, a system may be configured to perform one or more processes and/or one or more steps in a manner similar to that described herein with respect to process flows 200, 300, and/or 400 and FIGS. 2, 3, 4A, and/or 4B to determine whether the data feed failed to load.

As shown in block 512, the process flow 500 may include subdividing, into subdivided data feeds, the data feed or each of the subdivided data feeds that fails to load and that is not a single data row, where a number of the subdivided data feeds is determined using a machine learning model. For example, a system may be configured to perform one or more processes and/or one or more steps in a manner similar to that described herein with respect to process flow 200 and FIG. 2 to subdivide, into subdivided data feeds, the data feed or each of the subdivided data feeds that fails to load and that is not a single data row. Additionally, or alternatively, a system may be configured to determine the number of subdivided data feeds using a machine learning model in a manner similar to that described herein with respect to process flow 200 and FIG. 2.

As shown in block 514, the process flow 500 may include loading each of the subdivided data feeds to the target data structure. For example, a system may be configured to perform one or more processes and/or one or more steps in a manner similar to that described herein with respect to process flows 200, 300, and/or 400 and FIGS. 2, 3, 4A, and/or 4B load each of the subdivided data feeds to the target data structure.

As shown in block 516, the process flow 500 may include, for each of the subdivided data feeds that fails to load and that is a single data row, correcting an error in the subdivided data feed or adding the subdivided data feed to a failed data log. For example, a system may be configured to perform one or more processes and/or one or more steps in a manner similar to that described herein with respect to process flows 200, 300, and/or 400 and FIGS. 2, 3, 4A, and/or 4B to correct an error in the subdivided data feed or add the subdivided data feed to a failed data log.

As shown in FIG. 5, the process flow 500 may include repeating (e.g., iteratively performing) the steps represented by block 512, block 514, and block 516 until each subdivided data feed loads or is added to the failed data log. For example, a system may be configured to perform one or more processes and/or one or more steps in a manner similar to that described herein with respect to process flows 200, 300, and/or 400 and FIGS. 2, 3, 4A, and/or 4B to repeat the steps represented by block 512, block 514, and block 516 until each subdivided data feed loads or is added to the failed data log.

As shown in block 518, the process flow 500 may include transmitting, to a user device associated with the source, the failed data log. For example, a system may be configured to perform one or more processes and/or one or more steps in a manner similar to that described herein with respect to process flows 200, 300, and/or 400 and FIGS. 2, 3, 4A, and/or 4B to transmit, to a user device associated with the source, the failed data log.

Process flow 500 may include additional embodiments, such as any single embodiment or any combination of embodiments described below and/or in connection with one or more other processes described elsewhere herein.

In a first embodiment, the process flow 500 may include, when analyzing the metadata of the data feed, determining, based on the metadata of the data feed and historical feed data, a failure history of the data feed, a size of the data feed, a service-level agreement of the data feed, a cost of delaying loading the data feed, and/or the like.

In a second embodiment alone or in combination with the first embodiment, the process flow 500 may include, when analyzing the metadata of the data feed, determining, based on the failure history of the data feed, whether the data feed is associated with a history of repeated load failures, whether the size of the data feed satisfies a size threshold, whether the data feed is associated with a recent load failure, whether the cost of delaying loading the data feed impacts the service-level agreement of the data feed, and/or the like.

In a third embodiment alone or in combination with any of the first through second embodiments, the process flow 500 may include determining the likelihood of the data feed failing to load based on whether the data feed is associated with a history of repeated load failures, whether the size of the data feed satisfies the size threshold, whether the data feed is associated with a recent load failure, whether the cost of delaying loading the data feed impacts the service-level agreement of the data feed, and/or the like.

In a fourth embodiment alone or in combination with any of the first through third embodiments, the process flow 500 may include transmitting, based on determining that the likelihood of the data feed failing to load does not satisfy the threshold and to the user device associated with the source, a notification including the metadata.

In a fifth embodiment alone or in combination with any of the first through fourth embodiments, the process flow 500 may include correcting, based on determining that the likelihood of the data feed failing to load does not satisfy the threshold, one or more errors in the data feed based on the metadata of the data feed and historical feed data.

In a sixth embodiment alone or in combination with any of the first through fifth embodiments, the process flow 500 may include attempting to correct, based on determining that the likelihood of the data feed failing to load does not satisfy the threshold, one or more errors in the data feed based on the metadata of the data feed and historical feed data, determining whether the one or more errors in the data feed are corrected, transmitting, based on determining that the one or more errors in the data feed are not corrected and to the user device associated with the source, a notification comprising the metadata and instructions to correct the one or more errors in the data feed, and/or the like.

In a seventh embodiment alone or in combination with any of the first through sixth embodiments, the process flow 500 may include loading, based on determining that the one or more errors in the data feed are corrected, the data feed to the target data structure.

In an eighth embodiment alone or in combination with any of the first through seventh embodiments, the process flow 500 may include, when correcting the error in the subdivided data feed, determining, based on the metadata of the data feed and historical feed data, whether the error in the subdivided data feed is a formatting error in a value in the single data row, converting, based on determining that the error in the subdivided data feed is the formatting error in the value in the single data row, the value to an acceptable format based on the metadata, loading the single data row with the converted value to a temporary table having a same schema as the target data structure, and/or loading the temporary table to the target data structure.

In a ninth embodiment alone or in combination with any of the first through eighth embodiments, the process flow 500 may include, when correcting the error in the subdivided data feed, determining, based on the metadata of the data feed and historical feed data, whether the error in the subdivided data feed is a data integrity error in a value in the single data row, identifying, based on the metadata of the data feed and the historical feed data, another value having similar characteristics to the value, loading the single data row with the other value to a temporary table having a same schema as the target data structure, and/or loading the temporary table to the target data structure.

In a tenth embodiment alone or in combination with any of the first through ninth embodiments, the process flow 500 may include, when correcting the error in the subdivided data feed, determining, based on the metadata of the data feed and historical feed data, whether the error in the subdivided data feed is missing data in the single data row, identifying, based on the metadata of the data feed and the historical feed data, historical data corresponding to the missing data, loading the single data row with the historical data to a temporary table having a same schema as the target data structure, and/or loading the temporary table to the target data structure.

In an eleventh embodiment alone or in combination with any of the first through tenth embodiments, the process flow 500 may include, determining, based on the metadata of the data feed and historical feed data, whether the data feed includes multiple errors in a column, determining, based on determining that the data feed includes multiple errors in the column and based on the metadata of the data feed and the historical feed data, whether an entity priority of the data feed satisfies a threshold, vertically subdividing, based on the entity priority of the data feed satisfying the threshold, the data feed into vertically subdivided data feeds to remove the column, and/or loading the vertically subdivided data feeds to the target data structure.

In a twelfth embodiment alone or in combination with any of the first through eleventh embodiments, the process flow 500 may include determining, based on determining that the data feed failed to load and based on the metadata of the data feed and historical feed data, whether the data feed failed to load due to an input/output error, importing, based on determining that the data feed failed to load due to the input/output error, the data feed to another source, and/or loading the data feed from the other source to the target data structure.

In a thirteenth embodiment alone or in combination with any of the first through twelfth embodiments, the process flow 500 may include determining, based on determining that the data feed failed to load and based on the metadata of the data feed and historical feed data, whether the data feed failed to load due to inadequate resources of a processor, determining, based on determining that the data feed failed to load due to the inadequate resources of the processor, whether one or more low priority connections are using the processor, suspending, based on determining that the one or more low priority connections are using the processor, the one or more low priority connections, and/or loading, while suspending the one or more low priority connections, the data feed to the target data structure.

In a fourteenth embodiment alone or in combination with any of the first through thirteenth embodiments, the process flow 500 may include determining, based on determining that the data feed failed to load and based on the metadata of the data feed and historical feed data, whether the data feed failed to load due to inadequate resources of a processor, determining, based on determining that the data feed failed to load due to the inadequate resources of the processor, whether one or more low priority connections are using the processor, rescheduling, based on a log and based on determining that no low priority connections are using the processor, loading of the data feed to another time period, transmitting, to the user device associated with the source, a notification including the other time period, and loading the data feed to the target data structure during the other time period.

In a fifteenth embodiment alone or in combination with any of the first through fourteenth embodiments, the process flow 500 may include, when analyzing the metadata of the data feed to determine the likelihood of the data feed failing to load, comparing characteristics of the data feed and historical characteristics of historical data feeds that failed to load and determining the likelihood of the data feed failing to load based on the comparison.

Although FIG. 5 shows example blocks of process flow 500, in some embodiments, process flow 500 may include additional blocks, fewer blocks, different blocks, or differently arranged blocks than those depicted in FIG. 5. Additionally, or alternatively, two or more of the blocks of process flow 500 may be performed in parallel.

As noted above, in some embodiments, the process flows described herein may include performing one or more of the functions described herein using artificial intelligence, machine learning, a machine learning model, and/or the like. For example, the system may provide data and/or metadata associated with data feeds to a machine learning model trained (e.g., using data associated with historical data feeds, data associated with outcomes of attempts to load historical data feeds, and/or the like) to output likelihoods that loading data feeds will fail. As another example, the system may provide data and/or metadata associated with data feeds to a machine learning model trained (e.g., using data associated with historical data feeds, data associated with subdividing and/or splitting historical data feeds, data associated with outcomes of attempts to load subdivided and/or split historical data feeds, and/or the like) to output a number of subdivided data feeds and/or feed parts into which a data feed and/or a subdivided data feed should be split. As yet another example, the system may provide data and/or metadata associated with data feeds to a machine learning model trained (e.g., using data associated with historical data feeds, data associated with subdividing and/or splitting historical data feeds, data associated with correcting errors in historical data feeds, data associated with outcomes of attempts to load subdivided and/or split historical data feeds, data associated with outcomes of attempts to load historical data feeds including corrected errors, and/or the like) to output one or more thresholds. As yet another example, the system may provide data and/or metadata associated with data feeds to a machine learning model trained (e.g., using data associated with historical data feeds, data associated with subdividing and/or splitting historical data feeds, data associated with correcting errors in historical data feeds, data associated with outcomes of attempts to load subdivided and/or split historical data feeds, data associated with outcomes of attempts to load historical data feeds including corrected errors, and/or the like) to output one or more issue types and/or error types in the data feeds. As yet another example, the system may provide data and/or metadata associated with data feeds to a machine learning model trained (e.g., using data associated with historical data feeds, data associated with subdividing and/or splitting historical data feeds, data associated with correcting errors in historical data feeds, data associated with outcomes of attempts to load subdivided and/or split historical data feeds, data associated with outcomes of attempts to load historical data feeds including corrected errors, and/or the like) to output other data within the data feed having similar characteristics to erroneous data, historical data having similar characteristics to missing data, and/or the like.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instancebased method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on data associated with historical data feeds, data associated with subdividing and/or splitting historical data feeds, data associated with correcting errors in historical data feeds, data associated with outcomes of attempts to load subdivided and/or split historical data feeds, data associated with outcomes of attempts to load historical data feeds including corrected errors, and/or the like over a predetermined past period of time. In doing so, the system may be configured to generate likelihoods, thresholds, replacement data for erroneous and/or missing data, a number of subdivided data feeds and/or feed parts, types of errors in data feeds, and/or the like. In some embodiments, the one or more machine learning algorithms may be used to calculate likelihoods, and whether the likelihoods satisfy a threshold. Additionally, or alternatively, the system may continuously re-train the machine learning model using data and/or metadata associated with data feeds, outcomes of loading data feeds, feed parts, corrected data feeds, and/or subdivided data feeds loaded by the system, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for evaluating, validating, correcting, and loading data feeds based on artificial intelligence input, the system comprising:

at least one non-transitory storage device; and at least one processing device coupled to the at least one non-transitory storage device, wherein the at least one processing device is configured to:

train a first machine learning model using first historical data to determine thresholds for likelihoods of data feeds failing to load, wherein the thresholds are determined based on (i) sizes of data feeds associated with higher likelihoods of failing to load and (ii) associations of the data feeds with repeat failure histories, and wherein the first historical data comprises characteristics of historical data feeds and outcomes of loading the historical data feeds;

receive a data feed from a source for loading to a target data structure;

determine, using the first machine learning model and based on characteristics of the data feed, a threshold for a likelihood of the data feed failing to load;

analyze, based on historical feed data, metadata of the data feed to determine the likelihood of the data feed failing to load;

determine whether the likelihood of the data feed failing to load satisfies the threshold;

determine whether the data feed is associated with a recent rejection of another data feed based on characteristics of the data feed, characteristics of historical data feeds, the source from which the data feed was received, and the target data structure to which the data feed is to be loaded;

load, based on determining that the likelihood of the data feed failing to load satisfies the threshold and based on determining that the data feed is not associated with the recent rejection of the other data feed, the data feed to the target data structure;

determine, after loading the data feed to the target data structure, whether the data feed failed to load;

train a second machine learning model using second historical data to determine numbers of parts into which to split data feeds to have shortest times for at least one of successfully identifying errors or successfully loading the data feeds, wherein splitting the data feeds comprises, for a given data feed, dividing a total number of rows in the given data feed by a number N of parts and splitting the given data feed into the number N of subdivided data feeds each having the same number of rows;

based on determining that the data feed failed to load, iteratively and until each subdivided data feed loads or is added to a failed data log:

determine, using the second machine learning model, a number N of parts into which to split the data feed;

subdivide, into N subdivided data feeds, the data feed or each of the subdivided data feeds that fails to load and that is not a single data row:

load each of the subdivided data feeds to the target data structure; and for each of the subdivided data feeds that fails to load and that is a single data row, correct an error in the subdivided data feed or add the subdivided data feed to the failed data log;

transmit, to a user device associated with the source, the failed data log; and continuously retrain the first machine learning model and the second machine learning model using data and metadata associated with loaded data feeds, subdividing the loaded data feeds, correcting errors in the loaded data feeds, outcomes of attempts to load subdivided parts of the loaded data feeds, and outcomes of attempts to load loaded data feeds including corrected errors.

2. The system of claim 1, wherein the at least one processing device is configured to, when analyzing the metadata of the data feed, determine, based on the metadata of the data feed and historical feed data, a failure history of the data feed, a size of the data feed, a service-level agreement of the data feed, and a cost of delaying loading the data feed.

3. The system of claim 2, wherein the at least one processing device is configured to, when analyzing the metadata of the data feed, determine, based on the failure history of the data feed:

whether the data feed is associated with a history of repeated load failures;

whether the size of the data feed satisfies a size threshold; and whether the cost of delaying loading the data feed impacts the service-level agreement of the data feed.

4. The system of claim 3, wherein the at least one processing device is configured to determine the likelihood of the data feed failing to load based on whether the data feed is associated with a history of repeated load failures, whether the size of the data feed satisfies the size threshold, and whether the cost of delaying loading the data feed impacts the service-level agreement of the data feed.

5. The system of claim 1, wherein the at least one processing device is configured to transmit, based on determining that the likelihood of the data feed failing to load does not satisfy the threshold and to the user device associated with the source, a notification comprising the metadata.

6. The system of claim 1, wherein the at least one processing device is configured to correct, based on determining that the likelihood of the data feed failing to load does not satisfy the threshold, one or more errors in the data feed based on the metadata of the data feed and historical feed data.

7. The system of claim 1, wherein the at least one processing device is configured to:

attempt to correct, based on determining that the likelihood of the data feed failing to load does not satisfy the threshold, one or more errors in the data feed based on the metadata of the data feed and historical feed data;

determine whether the one or more errors in the data feed are corrected; and transmit, based on determining that the one or more errors in the data feed are not corrected and to the user device associated with the source, a notification comprising the metadata and instructions to correct the one or more errors in the data feed.

8. The system of claim 7, wherein the at least one processing device is configured to load, based on determining that the one or more errors in the data feed are corrected, the data feed to the target data structure.

9. The system of claim 1, wherein the at least one processing device is configured to, when correcting the error in the subdivided data feed:

determine, based on the metadata of the data feed and historical feed data, whether the error in the subdivided data feed is a formatting error in a value in the single data row;

convert, based on determining that the error in the subdivided data feed is the formatting error in the value in the single data row, the value to an acceptable format based on the metadata;

load the single data row with the converted value to a temporary table having a same schema as the target data structure; and load the temporary table to the target data structure.

10. The system of claim 1, wherein the at least one processing device is configured to, when correcting the error in the subdivided data feed:

determine, based on the metadata of the data feed and historical feed data, whether the error in the subdivided data feed is a data integrity error in a value in the single data row;

identify, based on the metadata of the data feed and the historical feed data, another value having similar characteristics to the value;

load the single data row with the other value to a temporary table having a same schema as the target data structure; and load the temporary table to the target data structure.

11. The system of claim 1, wherein the at least one processing device is configured to, when correcting the error in the subdivided data feed:

determine, based on the metadata of the data feed and historical feed data, whether the error in the subdivided data feed is missing data in the single data row;

identify, based on the metadata of the data feed and the historical feed data, historical data corresponding to the missing data;

load the single data row with the historical data to a temporary table having a same schema as the target data structure; and load the temporary table to the target data structure.

12. The system of claim 1, wherein the at least one processing device is configured to:

determine, based on the metadata of the data feed and historical feed data, whether the data feed comprises multiple errors in a column;

determine, based on determining that the data feed comprises multiple errors in the column and based on the metadata of the data feed and the historical feed data, whether an entity priority of the data feed satisfies another threshold;

vertically subdivide, based on the entity priority of the data feed satisfying the other threshold, the data feed into vertically subdivided data feeds to remove the column; and
load the vertically subdivided data feeds to the target data structure.

13. The system of claim 1, wherein the at least one processing device is configured to:
determine, based on determining that the data feed failed to load and based on the metadata of the data feed and historical feed data, whether the data feed failed to load due to an input/output error;
import, based on determining that the data feed failed to load due to the input/output error, the data feed to another source; and
load the data feed from the other source to the target data structure.

14. The system of claim 1, wherein the at least one processing device is configured to:
determine, based on determining that the data feed failed to load and based on the metadata of the data feed and historical feed data, whether the data feed failed to load due to inadequate resources of a processor;
determine, based on determining that the data feed failed to load due to the inadequate resources of the processor, whether one or more low priority connections are using the processor;
suspend, based on determining that the one or more low priority connections are using the processor, the one or more low priority connections; and
load, while suspending the one or more low priority connections, the data feed to the target data structure.

15. The system of claim 1, wherein the at least one processing device is configured to:
determine, based on determining that the data feed failed to load and based on the metadata of the data feed and historical feed data, whether the data feed failed to load due to inadequate resources of a processor;
determine, based on determining that the data feed failed to load due to the inadequate resources of the processor, whether one or more low priority connections are using the processor;
reschedule, based on a log and based on determining that no low priority connections are using the processor, loading of the data feed to another time period;
transmit, to the user device associated with the source, a notification comprising the other time period; and
load the data feed to the target data structure during the other time period.

16. The system of claim 1, wherein the at least one processing device is configured to, when analyzing the metadata of the data feed to determine the likelihood of the data feed failing to load:
compare the characteristics of the data feed and historical characteristics of historical data feeds that failed to load; and
determine the likelihood of the data feed failing to load based on the comparison.

17. A computer program product for evaluating, validating, correcting, and loading data feeds based on artificial intelligence input, the computer program product comprising a non-transitory computer-readable medium comprising code causing a first apparatus to:
train a first machine learning model using first historical data to determine thresholds for likelihoods of data feeds failing to load, wherein the thresholds are determined based on (i) sizes of data feeds associated with higher likelihoods of failing to load and (ii) associations of the data feeds with repeat failure histories, and wherein the first historical data comprises characteristics of historical data feeds and outcomes of loading the historical data feeds;
receive a data feed from a source for loading to a target data structure;
determine, using the first machine learning model and based on characteristics of the data feed, a threshold for a likelihood of the data feed failing to load;
analyze, based on historical feed data, metadata of the data feed to determine the likelihood of the data feed failing to load;
determine whether the likelihood of the data feed failing to load satisfies the threshold;
determine whether the data feed is associated with a recent rejection of another data feed based on characteristics of the data feed, characteristics of historical data feeds, the source from which the data feed was received, and the target data structure to which the data feed is to be loaded;
load, based on determining that the likelihood of the data feed failing to load satisfies the threshold and based on determining that the data feed is not associated with the recent rejection of the other data feed, the data feed to the target data structure;
determine, after loading the data feed to the target data structure, whether the data feed failed to load;
train a second machine learning model using second historical data to determine numbers of parts into which to split data feeds to have shortest times for at least one of successfully identifying errors or successfully loading the data feeds, wherein splitting the data feeds comprises, for a given data feed, dividing a total number of rows in the given data feed by a number N of parts and splitting the given data feed into the number N of subdivided data feeds each having the same number of rows;
based on determining that the data feed failed to load, iteratively and until each subdivided data feed loads or is added to a failed data log:
determine, using the second machine learning model, a number N of parts into which to split the data feed;
subdivide, into N subdivided data feeds, the data feed or each of the subdivided data feeds that fails to load and that is not a single data row;
load each of the subdivided data feeds to the target data structure; and
for each of the subdivided data feeds that fails to load and that is a single data row, correct an error in the subdivided data feed or add the subdivided data feed to the failed data log;
transmit, to a user device associated with the source, the failed data log; and
continuously retrain the first machine learning model and the second machine learning model using data and metadata associated with loaded data feeds, subdividing the loaded data feeds, correcting errors in the loaded data feeds, outcomes of attempts to load subdivided parts of the loaded data feeds, and outcomes of attempts to load loaded data feeds including corrected errors.

18. The computer program product of claim 17, wherein the non-transitory computer-readable medium comprises code causing the first apparatus to, when analyzing the metadata of the data feed, determine, based on the metadata of the data feed and historical feed data, a failure history of the data feed, a size of the data feed, a service-level agreement of the data feed, and a cost of delaying loading the data feed.

19. The computer program product of claim 18, wherein the non-transitory computer-readable medium comprises code causing the first apparatus to, when analyzing the metadata of the data feed, determine, based on the failure history of the data feed:
whether the data feed is associated with a history of repeated load failures;
whether the size of the data feed satisfies a size threshold; and
whether the cost of delaying loading the data feed impacts the service-level agreement of the data feed.

20. A method for evaluating, validating, correcting, and loading data feeds based on artificial intelligence input, the method comprising:
training a first machine learning model using first historical data to determine thresholds for likelihoods of data feeds failing to load, wherein the thresholds are determined based on (i) sizes of data feeds associated with higher likelihoods of failing to load and (ii) associations of the data feeds with repeat failure histories, and wherein the first historical data comprises characteristics of historical data feeds and outcomes of loading the historical data feeds;
receiving a data feed from a source for loading to a target data structure;
determining, using the first machine learning model and based on characteristics of the data feed, a threshold for a likelihood of the data feed failing to load;
analyzing, based on historical feed data, metadata of the data feed to determine the likelihood of the data feed failing to load;
determining whether the likelihood of the data feed failing to load satisfies the threshold;
determining whether the data feed is associated with a recent rejection of another data feed based on characteristics of the data feed, characteristics of historical data feeds, the source from which the data feed was received, and the target data structure to which the data feed is to be loaded;
loading, based on determining that the likelihood of the data feed failing to load satisfies the threshold and based on determining that the data feed is not associated with the recent rejection of the other data feed, the data feed to the target data structure;
determining, after loading the data feed to the target data structure, whether the data feed failed to load;
training a second machine learning model using second historical data to determine numbers of parts into which to split data feeds to have shortest times for at least one of successfully identifying errors or successfully loading the data feeds, wherein splitting the data feeds comprises, for a given data feed, dividing a total number of rows in the given data feed by a number N of parts and splitting the given data feed into the number N of subdivided data feeds each having the same number of rows;
based on determining that the data feed failed to load, iteratively and until each subdivided data feed loads or is added to a failed data log:
  determining, using the second machine learning model, a number N of parts into which to split the data feed;
  subdividing, into N subdivided data feeds, the data feed or each of the subdivided data feeds that fails to load and that is not a single data row;
  loading each of the subdivided data feeds to the target data structure; and
  for each of the subdivided data feeds that fails to load and that is a single data row, correcting an error in the subdivided data feed or adding the subdivided data feed to the failed data log;
transmitting, to a user device associated with the source, the failed data log; and
continuously retraining the first machine learning model and the second machine learning model using data and metadata associated with loaded data feeds, subdividing the loaded data feeds, correcting errors in the loaded data feeds, outcomes of attempts to load subdivided parts of the loaded data feeds, and outcomes of attempts to load loaded data feeds including corrected errors.

* * * * *